United States Patent
Giraldo et al.

(10) Patent No.: US 9,505,644 B2
(45) Date of Patent: *Nov. 29, 2016

(54) SIMULTANEOUS ANOXIC BIOLOGICAL PHOSPHORUS AND NITROGEN REMOVAL

(71) Applicant: AMERICAN WATER WORKS COMPANY, INC., Voorhees, NJ (US)

(72) Inventors: Eugenio Giraldo, Robbinsville, NJ (US); Yanjin Liu, Marlton, NJ (US); Swarna Muthukrishnan, Dayton, NJ (US)

(73) Assignee: AMERICAN WATER WORKS COMPANY, INC., Voorhees, NJ (US)

( * ) Notice: Subject to any disclaimer, the term of this patent is extended or adjusted under 35 U.S.C. 154(b) by 57 days.

This patent is subject to a terminal disclaimer.

(21) Appl. No.: 14/291,897

(22) Filed: May 30, 2014

(65) Prior Publication Data

US 2014/0263042 A1 Sep. 18, 2014

Related U.S. Application Data

(63) Continuation of application No. 12/886,321, filed on Sep. 20, 2010, now Pat. No. 8,747,671.

(51) Int. Cl.
*C02F 3/30* (2006.01)
*C02F 3/12* (2006.01)
(Continued)

(52) U.S. Cl.
CPC ............ *C02F 3/308* (2013.01); *C02F 3/1268* (2013.01); *C02F 3/1273* (2013.01); *C02F 3/302* (2013.01);
(Continued)

(58) Field of Classification Search
CPC .... C02F 3/308; C02F 3/1215; C02F 3/1268; C02F 3/1273; C02F 3/28; C02F 3/2846; C02F 3/302; C02F 3/307; C02F 2101/105; C02F 2101/16; Y10S 210/906; Y02W 10/15
USPC .......................... 210/605, 621, 623, 903, 906
See application file for complete search history.

(56) References Cited

U.S. PATENT DOCUMENTS 5,540,840 A 7/1996 Heitkamp et al.
5,650,069 A 7/1997 Hong et al.
(Continued)

FOREIGN PATENT DOCUMENTS

CL 199900683 8/1999
JP S58146495 A 9/1983
(Continued)

OTHER PUBLICATIONS

Non-Final Office Action dated Sep. 23, 2015 in U.S. Appl. No. 14/216,052, 12 pages.
(Continued)

*Primary Examiner* — Fred Prince
(74) *Attorney, Agent, or Firm* — Shook, Hardy & Bacon L.L.P.

(57) ABSTRACT

Methods and systems are provided for treating wastewater to simultaneously remove nitrogen, carbon, and phosphorus. The process includes an anoxic tank that receives at least two streams, including plant influent wastewater and return activated sludge. These streams are mixed in the anoxic tank to promote phosphorus release and fermentation of particulate and dissolved organic matter. The mixed liquor is transferred to an aerated tank having low dissolved oxygen concentrations to promote development of phosphorus-release bacteria that is eventually recycled to the anoxic tank by way of the return activated sludge. Simultaneous nitrification, denitrification, and phosphorus release occur in the aerated tank. A membrane tank separates treated effluent from activated sludge in a membrane tank.

17 Claims, 5 Drawing Sheets

(51) Int. Cl.
    *C02F 3/28*     (2006.01)
    *C02F 101/10*   (2006.01)
    *C02F 101/16*   (2006.01)

(52) U.S. Cl.
    CPC ............ *C02F 3/1215* (2013.01); *C02F 3/28* (2013.01); *C02F 3/2846* (2013.01); *C02F 3/307* (2013.01); *C02F 2101/105* (2013.01); *C02F 2101/16* (2013.01); *Y02W 10/15* (2015.05); *Y10S 210/906* (2013.01)

(56) References Cited

U.S. PATENT DOCUMENTS

| | | | |
|---|---|---|---|
| 5,833,856 A * | 11/1998 | Liu | C02F 3/308 210/151 |
| 5,863,433 A | 1/1999 | Behrends | |
| 6,406,629 B1 | 6/2002 | Husain et al. | |
| 6,712,970 B1 * | 3/2004 | Trivedi | C02F 3/006 210/605 |
| 7,172,699 B1 * | 2/2007 | Trivedi | C02F 3/1268 210/210 |
| 7,713,413 B2 * | 5/2010 | Barnes | C02F 3/1273 210/605 |
| 8,685,246 B2 | 4/2014 | Giraldo | |
| 8,747,671 B2 | 6/2014 | Giraldo et al. | |
| 9,045,356 B2 | 6/2015 | Sun et al. | |
| 2002/0040871 A1 | 4/2002 | Garcia et al. | |
| 2003/0111412 A1 * | 6/2003 | Jeong | C02F 3/06 210/605 |
| 2003/0217968 A1 | 11/2003 | Goel | |
| 2006/0060525 A1 | 3/2006 | Hoffland | |
| 2006/0113243 A1 | 6/2006 | Applegate et al. | |
| 2006/0249449 A1 * | 11/2006 | Nakhla | C02F 3/1273 210/605 |
| 2007/0000836 A1 | 1/2007 | Elefritz et al. | |
| 2007/0193949 A1 | 8/2007 | You et al. | |
| 2007/0235385 A1 | 10/2007 | Barnes | |
| 2008/0053897 A1 | 3/2008 | Zhu et al. | |
| 2008/0223784 A1 | 9/2008 | Martin et al. | |
| 2009/0230040 A1 | 9/2009 | Limcaco | |
| 2010/0219125 A1 | 9/2010 | Northrop et al. | |

FOREIGN PATENT DOCUMENTS

| | | |
|---|---|---|
| JP | 2000107787 A | 4/2000 |
| JP | 2001314890 A | 11/2001 |
| JP | 2005211832 A | 8/2005 |
| JP | 2006035138 A | 2/2006 |

OTHER PUBLICATIONS

European Office Action dated Feb. 19, 2016 in Application No. 118271303, 5 pages.
European Office Action dated Feb. 19, 2016 in Application No. 11827208.7, 5 pages.
European Office Action dated Feb. 23, 2016 in Application No. 11827190.7, 5 pages.
Final Office Action dated Mar. 30, 2016 in U.S. Appl. No. 14/216,052, 15 pages.
Non-Final Office Action dated Aug. 10, 2016 in U.S. Appl. No. 14/216,052, 15 pages.

* cited by examiner

SIMULTANEOUS ANOXIC BIOLOGICAL PHOSPHORUS AND NITROGEN REMOVAL

CROSS-REFERENCE TO RELATED APPLICATIONS

This application is a continuation application of and claims priority to U.S. application Ser. No. 12/886,321 filed Sep. 20, 2010, entitled "SIMULTANEOUS ANOXIC BIOLOGICAL PHOSPHORUS AND NITROGEN REMOVAL," which is hereby incorporated by reference in its entirety.

BACKGROUND

Removing various components from wastewater, such as nitrogen, carbon, and phosphorus can be a difficult and high-cost process that in some instances may require the addition of a carbon source to wastewater treatment process. Additionally, a high concentration of dissolved oxygen used in many wastewater treatment processes contributes substantially to the cost of energy usage of a wastewater treatment plant. A carbon source, such as methanol, may be added to the process in an anoxic tank, for example, to assist with nitrification and denitrification. Further, an aerated tank may require high concentrations of dissolved oxygen to promote oxidation of biological oxygen demand (BOD) and ammonia. The addition of a carbon source and the requirement of high concentrations of dissolved oxygen, however, are costly and significantly contribute to the expense of treating wastewater.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In a first aspect, a process is provided for treating wastewater to simultaneously remove organic matter, nitrogen, and phosphorus. The process includes providing two or more streams in a first tank operating under anoxic conditions, the two or more streams including plant influent wastewater and return activated sludge. The plant influent wastewater and the return activated sludge are mixed in the first tank to form a mixed liquor, thereby initiating phosphorus release and fermentation of particulate organic matter and dissolved organic matter. The mixed liquor is then transferred to a second tank operating under microaerophilic conditions. A concentration of dissolved oxygen in the second tank is less than 1.0 mg/l to promote simultaneous nitrification, denitrification, phosphorous release, and phosphorus uptake. Further, the mixed liquor is transferred to a third tank that separates treated effluent from activated sludge containing microorganisms. A first portion of the activated sludge is returned to the first tank as the return activated sludge.

In a second aspect, a process is provided for treating wastewater to simultaneously remove organic matter, nitrogen, and phosphorus. The process includes contacting plant influent wastewater with return activated sludge in an anoxic tank to form a mixed liquor. The return activated sludge contains bacteria capable of initiating phosphorus release in the anoxic tank. The mixed liquor flows to an aerated tank having low dissolved oxygen concentrations to allow for fermentation of particulate organic matter and dissolved organic matter, and to provide conditions favorable for developing phosphorus-removal bacteria. The mixed liquor then flows to a membrane tank to separate plant effluent from activated sludge. Additionally, a portion of the activated sludge is recycled to the anoxic tank as the return activated sludge.

In a third aspect, a system is provided for treating wastewater to simultaneously remove organic matter, nitrogen, and phosphorus. The system includes a first tank that receives plant influent wastewater and return activated sludge, and that operates under anoxic conditions to promote denitrification, phosphorus release and fermentation of particulate organic matter and dissolved organic matter. A second tank receives a mixed liquor from the first tank. The second tank has a concentration of dissolved oxygen of less than 1.0 mg/l to effectively promote development of phosphorus-release bacteria that is present in the return activated sludge received into the first tank. The phosphorus-release bacteria in the return activated sludge allows for the phosphorus release and fermentation of particulate organic matter in the first tank. A third tank is provided that separates plant effluent from activated sludge, a portion of which is recycled to the first tank as the return activated sludge.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figure 1:
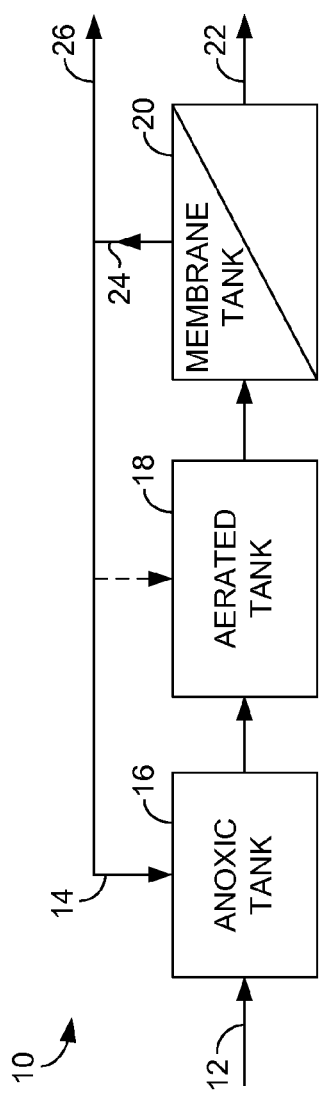
FIG. 1 illustrates a schematic view of a wastewater treatment process, in accordance with an embodiment of the present invention.

FIG. 1 illustrates a schematic view of a wastewater treatment process 10. More specifically, the wastewater treatment process provides an energy and cost efficient method for the simultaneous removal of nitrogen, phosphorus, and organic matter from plant influent wastewater. While many systems require an external carbon source and high levels of dissolved oxygen, embodiments of the present invention do not require either, and in fact require very low amounts of dissolved oxygen and carbon in comparison to amounts typically used in wastewater treatment systems. For instance, many systems require an external carbon source for phosphorus removal and nitrogen removal, but in embodiments of the present invention, nitrogen removal requires only minimum amounts of carbon, as it uses mostly ammonia. Further, phosphorus removal uses dissolved and particulate carbon (e.g., particulate organic matter) that is present in the wastewater, instead of only dissolved carbon or an external carbon source. In the embodiment of FIG. 1, three separate tanks are used to simultaneously remove nitrogen, phosphorus, and organic matter from plant influent wastewater 12. As used herein, plant influent wastewater 12 is raw wastewater that has not yet been treated and therefore has not yet entered a wastewater treatment system, such as the wastewater treatment systems that are described herein.

A first tank shown in FIG. 1 is an anoxic tank 16 that receives at least two streams, including the plant influent wastewater 12 and return activated sludge 14. As will be discussed further herein, the return activated sludge 14 is a portion of activated sludge that is recycled from the third tank, or the membrane tank 20, into one or more of the other tanks, such as the anoxic tank 16. As used herein, activated sludge is a stream that has been separated from the plant effluent. This activated sludge stream contains a microbial mass, in addition to nitrates and dissolved oxygen. The microbial mass includes a variety of biological components, including bacteria, fungi, protozoa, rotifers, etc. While both heterotrophic and autotrophic bacteria may reside in activated sludge, heterotrophic bacteria typically predominate. Heterotrophic bacteria obtain energy from carbonaceous organic matter in plant influent wastewater for the synthesis of new cells. These bacteria then release energy via the conversion of organic matter into compounds, such as carbon dioxide and water. Autotrophic bacteria in activated sludge generally reduce oxidized carbon compounds, such as carbon dioxide, for cell growth. These bacteria obtain their energy by oxidizing ammonia to nitrate, known as nitrification, which is further described herein.

As mentioned above, the return activated sludge 14 is a portion of the activated sludge that is produced by the separation step (e.g., membrane tank or membrane bioreactor) at the end of the treatment process. The return activated sludge 14 is recycled into the anoxic tank 16 and provides the tank with microbial mass, residual oxygen, nitrates, and nitrites. It should be noted that phosphorus release typically does not occur in anoxic tanks with return activated sludge having nitrates and dissolved oxygen, but in embodiments of the present invention, phosphorus release does occur in the anoxic tank 16. Phosphorus release occurs because the bacteria that is used to consume phosphorus is also present in the return activated sludge 14. Additionally, phosphorus release occurs because of active hydrolysis and fermentation conditions of particulate organic matter present in the influent wastewater. As used herein, hydrolysis is the breakdown of polymeric organic matter into monomers by bacterial action. In one embodiment, hydrolysis refers to a chemical reaction during which molecules of water are split into hydrogen cations and hydroxide anions in the process of a chemical mechanism. This type of reaction is used to break down certain polymers. As such, instead of just using dissolved organic matter as the carbon source for phosphorus removal, embodiments of the present invention allow for both dissolved and particulate organic matter to be used as a carbon source for phosphorus removal. Normally particulate organic matter cannot be used, but because it is fermented here, it can be used as a carbon source, thus eliminating the need for an external carbon source.

In wastewater, organic matter occurs as particulate organic matter and dissolved organic matter. Three main tests are used for determining the organic matter in wastewater. These include biological oxygen demand (BOD), total organic carbon (TOC), and chemical oxygen demand (COD). Unlike dissolved organic matter, particulate organic matter takes the form of suspended solids found in wastewater. As further discussed herein, particulate organic matter undergoes the process of hydrolysis to convert the particulates into soluble solids, thus allowing for higher rates of phosphorus removal when embodiments of the present invention are utilized.

Phosphorus release and phosphorus uptake refer to the process of phosphorus accumulating organisms (PAOs) storing polyphosphate as an energy reserve in intracellular granules. In anaerobic conditions, the PAOs release orthophosphate, utilizing the energy to accumulate simple organics and store them as polyhydroxyalkanoates (PHAs). In aerobic conditions, or at least conditions where there is some oxygen present, the PAOs grow on the stored organic material, using some of the energy to take up orthophosphate and store it as polyphosphate. As such, when the PAOs store carbon for future growth, the PAOs also release phosphorus, sometimes simultaneously. When the PAOs use stored carbon, they uptake phosphorus. As will be further described herein, an aerated tank has low levels of dissolved oxygen, but the PAOs still uptake phosphorus. When oxygen is present, the PAOs can get energy out of the carbon. Therefore when carbon is abundant, the PAOs store it in their cells and wait until there are conditions where oxygen is present so that they can use the carbon for growth and uptake phosphorus. The phosphate is then removed in the waste activated sludge 26, which is generally the activated sludge that is not recycled to the anoxic tank 16. The development of the PAO population will be discussed further herein. The anoxic tank 16 operates under anoxic conditions such that there is little to no dissolved oxygen, but nitrates (e.g., $NO_2$ and $NO_3$) may be present. A continuous oxygen deficit is maintained in the anoxic tank.

The anoxic tank 16, in one embodiment, has a mixer that mixes the plant influent wastewater 12 and the return activated sludge 14 to form a mixed liquor. The mixed liquor, as used herein, simply refers to a mixture of plant influent wastewater 12 and return activated sludge 14. The rate of mixing may be adjusted, in addition to adjusting the flow rate of the return activated sludge 14, to control the phosphorus release in the anoxic tank 16. It should be noted that the addition of an external carbon source, such as methanol, is avoided in embodiments of the present invention such that there is no additional carbon source needed to carry out embodiments of the present invention. In addition to phosphorus release, denitrification also occurs in the anoxic tank 16. Denitrification is the breakdown of nitrites or nitrates to give off nitrogen gas, and occurs as microbes consume oxygen from the nitrites or nitrates. More specifically, denitrification is a microbially facilitated process of dissimilatory nitrate reduction ultimately producing molecular nitrogen ($N_2$), which is returned to the atmosphere.

Nitrates and nitrites are converted into nitrogen gas by way of a denitrification process. Denitrification generally reduces oxidized forms of nitrogen in response to the oxidation of an electron donor, such as organic matter which, here, is present in the return activated sludge 14. This process is performed primarily by heterotrophic bacteria in an environment where oxygen is depleted, or where oxygen consumption exceeds the rate of oxygen supply, such as the anoxic tank 16 and the aerated tank 18. Utilizing embodiments of the present invention, the denitrification process is also conducted by autotrophic nitrifiers under conditions of low dissolved oxygen in the anoxic tank 16 and the aerated tank 18. The following reactions illustrate the denitrification process, including an illustrative redox reaction:

$$NO_3^- \rightarrow NO_2^- \rightarrow NO + N_2O \rightarrow N_2(g) \tag{1}$$

$$2NO_3^- + 10\ e^- + 12H^+ \rightarrow N_2 + 6H_2O \tag{2}$$

Particulate organic matter and dissolved organic matter from the plant influent wastewater 12 are fermented in the anoxic tank. The conditions in the anoxic tank in embodiments of the present invention induce high rates of hydrolysis and fermentation of particulate organic matter, which provides fermented organic matter in excess of what is needed for the denitrification reaction, allowing for simultaneous release of phosphorus and the formation of PHAs. The fermentation of particulate organic matter allows for additional carbon to be used for phosphorus removal. The average detention time of the influent wastewater flow in the anoxic tank may vary from one hour to ten hours. In one embodiment, the dissolved oxygen concentration in the anoxic tank is less than 0.3 mg/L. In further embodiments, the dissolved oxygen concentration in the anoxic tank is less than 0.2 mg/L. In an even further embodiment, the dissolved oxygen concentration in the anoxic tank is 0.1 mg/L or less. Further, recirculation rates of the return activated sludge may vary between 0.3 to 6 times the influent flow rate.

The anoxic mixed liquor is transferred to an aerated tank 18. While a single aerated tank 18 is illustrated in FIG. 1, multiple aerated tanks may be used, and may be configured either in parallel or in series. Alternatively, one aerated tank may be used, but the aerated tank may have more than one compartment through which the mixed liquor flows. The purpose of having more than one compartment is to improve the kinetic conditions of the overall process minimizing tank volume. Optionally, a portion of the activated sludge is transferred into the aerated tank to provide an additional bacterial population needed to ferment the particulate and dissolved organic matter and to promote phosphorus release. This is advantageous in those cases where the nitrate concentrations in the membrane tank are excessively high. Unlike many aerated tanks, the aerated tank 18 provided for in embodiments of the present invention is operated under very low dissolved oxygen concentrations, such as microaerophilic conditions, which promotes the development of the bacterial population (e.g., phosphate accumulating organisms (PAO)) used for phosphorus release and uptake. Generally, this bacterial population is capable of storing phosphorus, such as in the form of polyphosphates, and metabolizes it for energy production and cell synthesis, resulting in the removal of phosphorus from the system through the activated sludge. This particular bacterial population is unable to develop where there are high concentrations of dissolved oxygen. Since this particular bacterial population is able to develop in the aerated tank 18, it is also present in the return activated sludge 14 that is recycled to the anoxic tank 16, thereby allowing for phosphorus release in the anoxic tank 16. Phosphorus uptake may occur simultaneously with phosphorus release in the aerated tank 18.

In addition to phosphorus release and phosphorus uptake, nitrification and denitrification also occur in the aerated tank 18. In one embodiment, nitrification, denitrification, and phosphorus release occur simultaneously in the aerated tank 18. As previously described, denitrification is a microbially facilitated process of dissimilatory nitrate reduction that ultimately produces nitrogen gas by reducing oxidized forms of nitrogen. Nitrification, on the other hand, is the breakdown of ammonia into nitrate and water. More particularly, nitrification is the biological oxidation of ammonia with oxygen into nitrite followed by the oxidation of nitrites into nitrates. Two groups of organisms are generally responsible for the oxidation of ammonia into nitrite. These two groups are ammonia-oxidizing bacteria (AOB) and ammonia-oxidizing archaea (AOA). The following equations represent the nitrification process:

$$NH_3 + CO_2 + 1.5O_2 + \text{Nitrosomonas} \rightarrow NO_2^- + H_2O + H^+ \tag{3}$$

$$NO2 + CO_2 + 0.5O_2 + \text{Nitrobacter} \rightarrow NO_3^- \tag{4}$$

$$NH_3 + O_2 \rightarrow NO_2^- + 3H^+ + 2e^- \tag{5}$$

$$NO_2^- + H_2O \rightarrow NO_3^- + 2H^+ + 2e^- \tag{6}$$

In embodiments of the present invention, however, the reactions represented by equations (4) and (6) occur at a minimum, thus reducing the need for oxygen and obtaining significant savings in energy usage. In some embodiments, very little to no nitrates are found in the mixed liquor because reactions (4) and (6) are such a small percentage of the overall process such that in equation (1) above, it is mainly nitrites rather than nitrates being converted to nitrogen gas. As such, in equation (2), there are less than 10 electrons needed to convert nitrite to nitrogen gas. In embodiments of the present invention, these electrons, rather than coming from methanol or another external carbon source, come from ammonia. This will be discussed in more detail below. As shown by reactions (3) and (5) above, ammonia is used to convert nitrites into nitrogen gas. As an external carbon source is not required, some of the ammonia is used for reactions (3) and (5), but some of the ammonia is also used as a reducing source of electrons for denitrification. This is how nitrification and denitrification can occur in systems with low oxygen concentrations and without an external carbon source.

Further, the microaerophilic conditions allow for fermentation of particulate and dissolved organic matter in the aerated tank 18, which would not typically occur with higher concentrations of dissolved oxygen.

As mentioned above, nitrification and denitrification occur in both the anoxic and aerated tanks, according to embodiments of the present invention. Conventional nitrification-denitrification is represented by reactions (7), (8), and (9) below. Reaction (9) is the net of reactions (7) and (8). Many times, this sequence of reactions requires a high concentration of dissolved oxygen and an external carbon source. Here, about 4.57 grams of $O_2$ per gram of N—$NH_3$ are required for reaction (7) and about 2.86 grams of COD-$O_2$ per gram of N—$NO_3$ are required for reaction (8). The equations are as follows:

$$1NH_3 + 2O_2 \rightarrow 1HNO_3 + H_2O \tag{7}$$

$$1HNO_3 + \text{Organic Matter} \rightarrow \frac{1}{2}N_2 + H_2O \tag{8}$$

Reactions (9) and (10) below illustrate a process called a nitrification shortcut where the initial reaction, or reaction (10), is driven only to nitrite, which results in a savings in the needs of both oxygen demand and organic matter. About 3.43 grams of $O_2$ per gram of $N-NH_3$ is required for reaction (9) and about 1.71 grams of $COD-O_2$ per gram of $N-NH_3$ are required for reaction (10). In one instance, when comparing the first set of reactions above (reactions (7)-(8)) to the second set of reactions below (reactions (9)-(10)), the oxygen demand is decreased by about 25% (4.57 g $O_2$/g $N-NH_3$–3.43 g $O_2$/g $N-NH_3$ =1.15 g $O_2$/g $N-NH_3$) and the need for organic matter is decreased by about 40% (2.86 g $O_2$/g $N-NO_3$-1.71 g $O_2$/g $N-NH_3$=1.15 g COD/g $N-NH_3$).

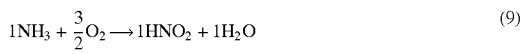

$$1NH_3 + \frac{3}{2}O_2 \rightarrow 1HNO_2 + 1H_2O \qquad (9)$$

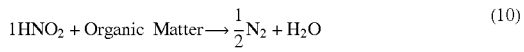

$$1HNO_2 + \text{Organic Matter} \rightarrow \frac{1}{2}N_2 + H_2O \qquad (10)$$

The set of reactions below labeled (11) and (12) occur in the anoxic tank and the aerated tank. In some instances, this set of reactions is referred to as a nitrifier-denitrification process. As shown in equation (11), ammonia and oxygen are converted into nitrogen gas, nitrous acid, and water. Organic matter is then used to convert the nitrous acid into nitrogen gas, water, and carbon dioxide. About 2.28 grams of $O_2$ per gram of $N-NH_3$ is required for reaction (11) and about 0.57 grams of COD per gram of $N-NH_3$ is required for reaction (12). When comparing the three sets of reactions, this third set of reactions (reactions (13)-(15)) requires the least amount of oxygen. The savings in organic matter is about 80% (2.86 g $O_2$/g $N-NO_3$–0.57 g COD/g $N-NH_3$=2.29 g $O_2$/g N) when comparing the amount of organic matter required for the third set of reactions below to the first set of reactions (reactions (7)-(8)). Further, the savings in oxygen required between the first and the third set of equations is about 50% (4.57 g $O_2$/g $N-NH_3$–2.28 g $O_2$/g $N-NH_3$=2.28 g $O_2$/g N).

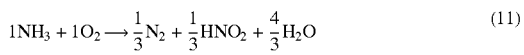

$$1NH_3 + 1O_2 \rightarrow \frac{1}{3}N_2 + \frac{1}{3}HNO_2 + \frac{4}{3}H_2O \qquad (11)$$

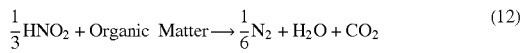

$$\frac{1}{3}HNO_2 + \text{Organic Matter} \rightarrow \frac{1}{6}N_2 + H_2O + CO_2 \qquad (12)$$

Returning to FIG. 1, the mixed liquor is then transferred from the aerated tank 18 to a third tank, here shown as a membrane tank 20, for a solid-liquid separation step where the microorganisms are separated from the treated water. In activated sludge processes, such as those described herein, the dissolved organic pollutants are transformed into water, carbon dioxide, and biomass, which results in an excess production of sludge. The membrane tank 20 separates this sludge from the treated plant effluent 22. In one embodiment, the membrane tank is a membrane bioreactor that is a combination of a membrane process (e.g., microfiltration, ultrafiltration, hollow fiber, flat sheet, tubular) with a suspended growth bioreactor. A bioreactor refers to a device that supports a biologically active environment. Because a bioreactor must be associated with a separation unit to recover the biomass and the purified liquid, and of the inefficiencies and inconvenience of separate units, membrane bioreactors are used to provide the same or better results, but in a single unit. As such, a membrane bioreactor is an association of a biologic reactor and a cross-flow filtration. In one instance, the membrane tank 20 is aerated to provide water turbulence for scouring the submerged membrane filter. In one embodiment, the membrane filter utilized microfiltration, but in another embodiment, ultrafiltration is used.

The result of the membrane filtration occurring in the membrane tank 20 is at least two exit streams, including treated plant effluent 22 and activated sludge 24, a portion of which is recycled to the anoxic tank 16, and in some embodiments, to the aerated tank 18. As used herein, treated plant effluent 22 is the stream exiting the third tank that has been treated for the removal of carbon, nitrogen, phosphorus, and other unwanted constituents. The excess activated sludge is shown as activated sludge 26. The amount of activated sludge 24 that is recycled to the anoxic tank 16 varies, but in some embodiments ranges anywhere from 50% to 600% of the amount of plant influent wastewater 12 entering the anoxic tank 16. As such, for every one gallon of plant influent wastewater 12, 0.5 to 6 gallons of return activated sludge 14 may be added to the anoxic tank 16. In an alternative embodiment, the third tank in the embodiment of FIG. 1, although illustrated as a membrane tank 20, is a clarifier. Clarifiers are tanks used to separate, thicken, and recycle the activated sludge. Typically, clarifiers have a much larger footprint than membrane bioreactors.

Figure 2:
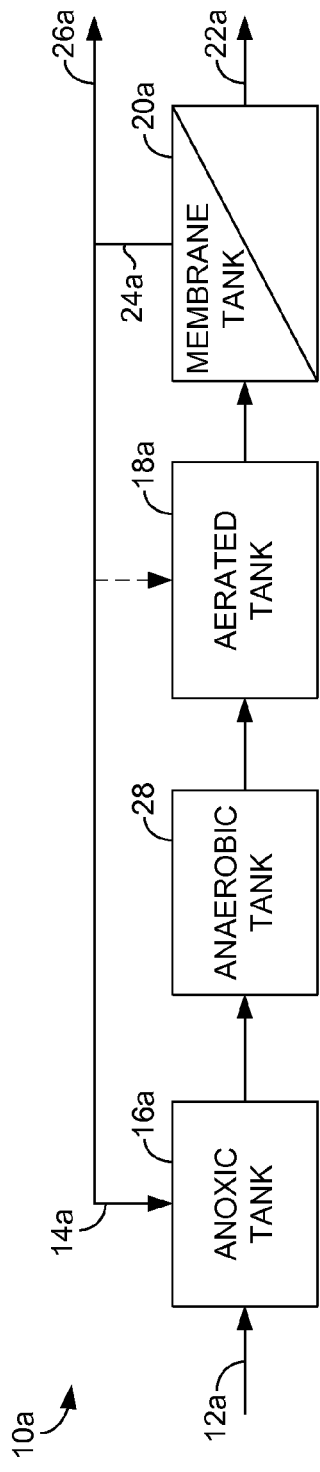
FIG. 2 illustrates a schematic view of an alternate wastewater treatment process, in accordance with an embodiment of the present invention.

Referring now to FIG. 2, a schematic view is illustrated of an alternate wastewater treatment process. An anoxic tank 16a, an aerated tank 18a, and a membrane tank 20a are illustrated in the embodiment of FIG. 2 and operate similarly to those described in FIG. 1. Here, an anaerobic tank 28 is added downstream of, or after the anoxic tank 16a and upstream of, or before the aerated tank 18a. Generally, the anaerobic tank 28 operates under anaerobic conditions, or under the absence of oxygen. The anaerobic tank 28 is a non-aerated tank, such that there is no added oxygen and there are no nitrates. The contents are mixed in the anaerobic tank 28 such that a mixer is present. The embodiment of FIG. 2, or specifically where an anaerobic tank 28 is added to the system, is used in conditions where the characteristics of the organic matter present in the influent wastewater stream are such that additional retention time is needed for both hydrolysis and fermentation of the particulate organic matter. In one embodiment, additional phosphorus release takes place in the anaerobic tank 28. Similar to that described in FIG. 1, plant influent wastewater 12a is mixed with return activated sludge 14a in an anoxic tank 16a. The mixed liquor is first transferred to an anaerobic tank 28, then to an aerated tank 18a, and finally to a membrane tank 20a. Exiting from the membrane tank 20a is treated plant effluent 22a and activated sludge 24a. A portion of the activated sludge 24a is recycled to the anoxic tank 16a as return activated sludge 14a, and optionally, a portion is also recycled to the aerated tank 18a. The waste activated sludge 26a, in one embodiment, is disposed of.

Figure 3:
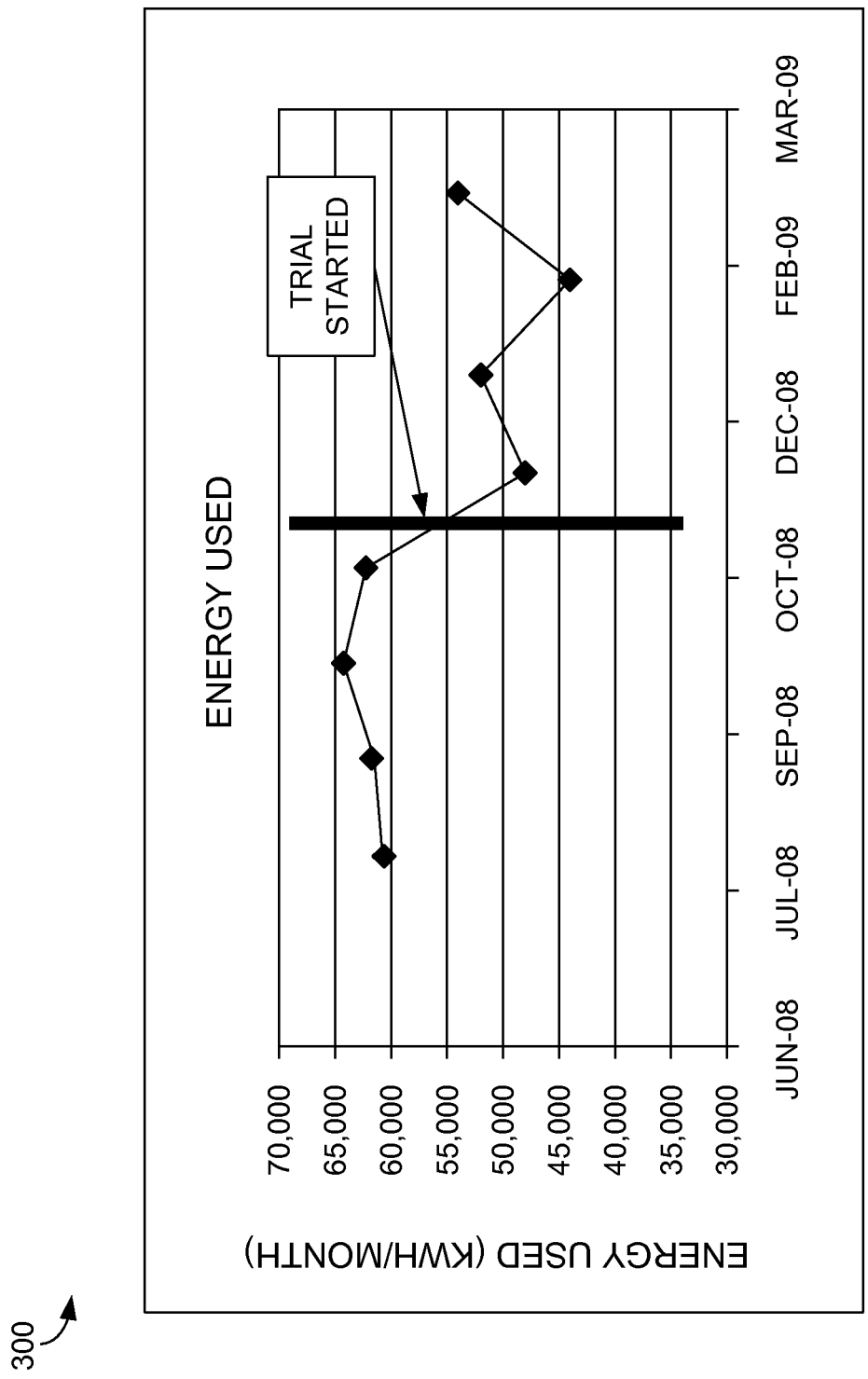
FIG. 3 illustrates a decrease of energy usage at a wastewater treatment plant as a result of implementation of embodiments of the present invention.

FIG. 3 illustrates a line graph 300 showing a decrease of energy usage at a wastewater treatment plant as a result of the implementation of embodiments of the present invention. As mentioned, when dissolved oxygen concentrations are kept to a minimum in the aerated tank, energy usage costs significantly decrease, as the addition of dissolved oxygen costs may account for up to 50% of total energy costs for a wastewater treatment plant. As indicated by "trial started," the technology described herein was tested and it was found that energy costs significantly decreased at least partially due to the low amounts of dissolved oxygen required in the aerated tank. As shown, before the trial, the highest energy usage is about 64,000 kWh/month, while the highest after the trial is about 54,000 kWh/month, although the levels reached much lower amounts for previous months.

Figure 4:
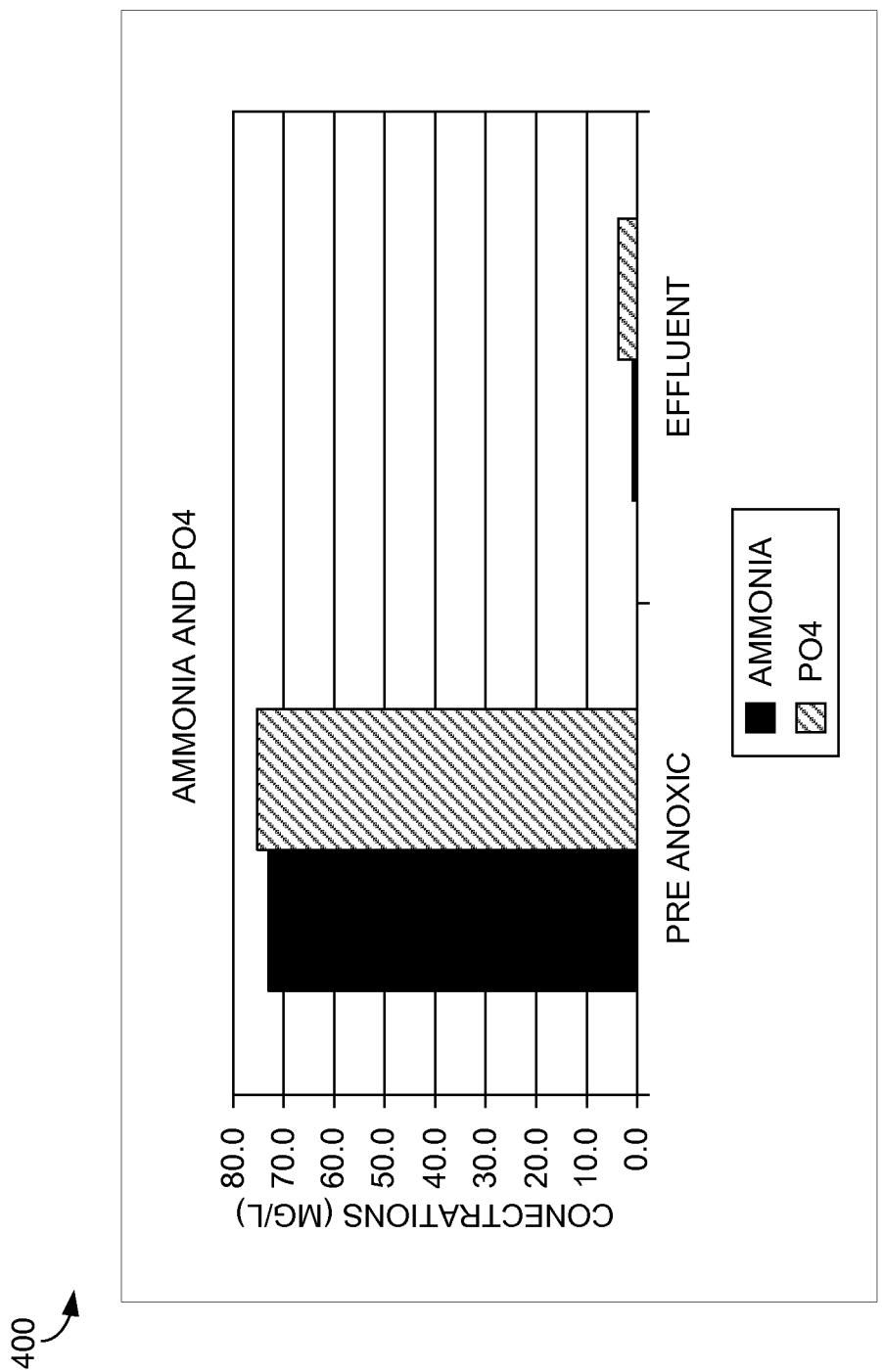
FIG. 4 illustrates a decrease of both ammonia and phosphate when embodiments of the present invention are implemented in a wastewater treatment plant.

Turning now to FIG. 4, a bar graph 400 is illustrated that shows a decrease of both ammonia and phosphate when embodiments of the present invention are implemented in a wastewater treatment plant. As shown here, influent concentrations of ammonia were around 72 mg/l, but dropped to around 1 mg/l after the plant influent wastewater was treated using the treatment methods described herein. Further, influent concentrations of phosphate dropped from around 74 mg/l to around 4 mg/l after the plant influent wastewater was treated using the treatment methods described herein.

EXAMPLE

Figure 6:
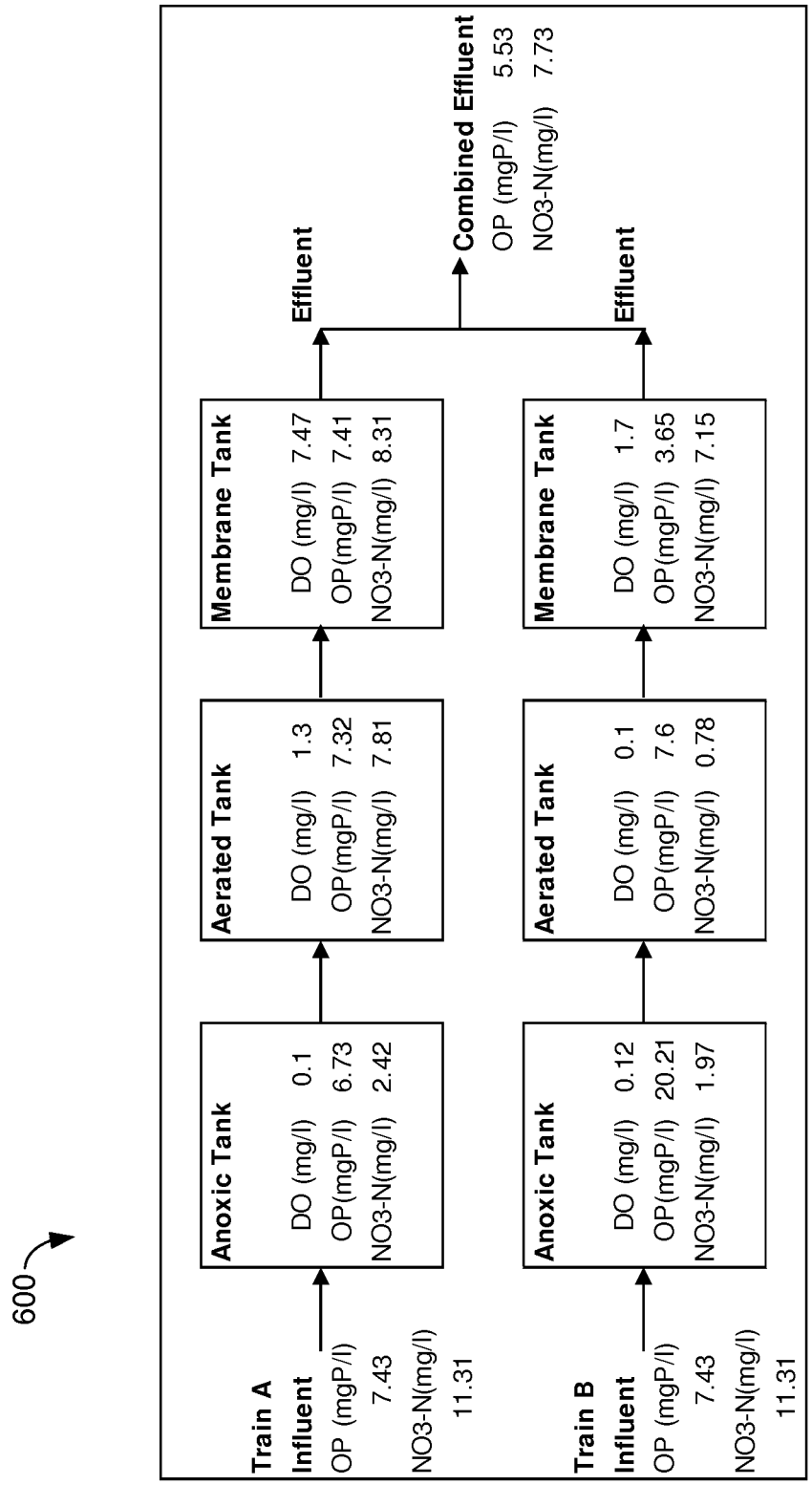
FIG. 6 illustrates a table of concentrations of dissolved oxygen, phosphorus, and nitrates in a typical process and processes using embodiments of the present invention.

The following example, illustrated in FIG. 6, illustrates a plant that has two parallel trains 600, including a first train (train A) and a second train (train B). The tanks in each trains are identical and are in the same location. The conditions in the tanks, however, are different. Train A represents a typical process that would occur without the user of embodiments of the present invention, while train B represents a process that uses embodiments of the present invention, such as a low dissolved oxygen concentration in the aerated tank, as previously discussed. For example, as shown in FIG. 6, the dissolved oxygen concentration in the aerated tank of train A is 1.3 mg/l, while the dissolved oxygen concentration in the aerated tank of train B is 0.1 mg/l. As shown by the levels of phosphorus and nitrate/nitrite removal, in train B compared with those of train A, the lower levels of dissolved oxygen in the aerated tank allow for the development of the phosphorus-removal bacteria in the aerated tank. These phosphorus-removal bacteria are then present in the return activated sludge (not shown in FIG. 6) from the membrane tank back to the anoxic tank. Phosphorus release is observed in the anoxic tank of train B, while not in the anoxic tank of train A. Net phosphorus uptake takes place in the aerated tank of train B and not in the aerated tank of train A. Therefore, higher levels of phosphorus uptake and removal in the process occur. As a result, the levels of phosphorus in the membrane tank or the plant effluent are 3.65 mg/l for train B, which is much lower than the levels in the membrane tank for train A, which are 7.41 mg/l. Similarly, simultaneous nitrification-denitrification take place in the aerated tank of train B while only nitrification takes place in the aerated tank of train A, as reflected by the significantly higher difference in nitrate concentration. The levels of nitrates/nitrites in the membrane tank for train B are 7.15 mg/l, which is lower than the 8.31 mg/l levels in the membrane tank of train A.

Figure 5:
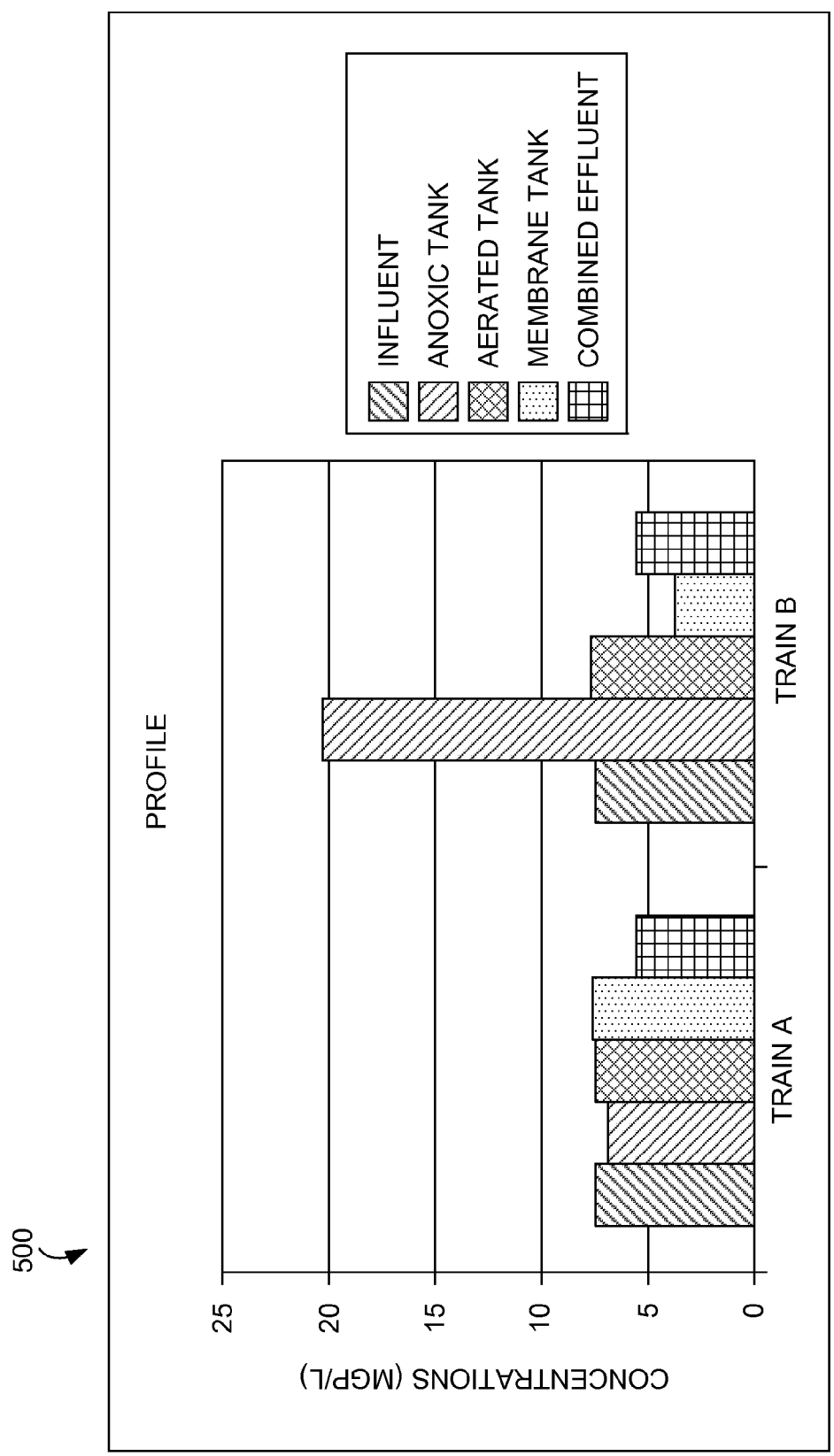
FIG. 5 illustrates a bar graph showing the concentrations of phosphorus, dissolved oxygen, and nitrates in each tank.

Continuing with the example described above as illustrated in FIG. 6, FIG. 5 illustrates a bar graph 500 showing the concentrations of phosphorus, dissolved oxygen, and nitrates in each tank. In comparing the levels of phosphorus, for example, it can be seen that the levels are much lower in the membrane tank for train B than for train A, which is due, in part, to the low dissolved oxygen concentrations in the aerated tank.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure. Further, alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A process for treating wastewater to simultaneously remove organic matter, nitrogen, and phosphorus, the process comprising:
    providing two or more streams in a first tank operating under anoxic conditions, the two or more streams including plant influent wastewater and return activated sludge;
    mixing the plant influent wastewater and the return activated sludge in the first tank to form a mixed liquor;
    transferring the mixed liquor to a second tank operating under microaerophilic conditions to simultaneously effectuate nitrification, denitrification, phosphorous release, and phosphorus uptake in the second tank; and
    transferring the mixed liquor to a third tank that separates treated effluent from activated sludge containing microorganisms, wherein a first portion of the activated sludge is returned to the first tank as the return activated sludge and a second portion of the activated sludge is returned to the second tank.

2. The process of claim 1, wherein the third tank is a membrane bioreactor.

3. The process of claim 1, wherein the third tank is a clarifier.

4. The process of claim 1, wherein phosphorus release occurs in the first tank, and wherein an amount of the phosphorus release occurring in the first tank is based on one or more of a mixing rate of the plant influent wastewater and the return activated sludge or a flow rate of the return activated sludge into the first tank.

5. The process of claim 1, wherein the microaerophilic conditions in the second tank promote fermentation of particulate organic matter in the mixed liquor.

6. The process of claim 1, wherein the microaerophilic conditions in the second tank allow for development of a microbial population used for phosphorus removal.

7. The process of claim 1, wherein the return activated sludge provided in the first tank comprises residual oxygen, nitrates, and nitrites.

8. The process of claim 1, wherein the anoxic conditions in the first tank allow for phosphorus uptake to occur.

9. A process for treating wastewater to simultaneously remove organic matter, nitrogen, and phosphorus, the process comprising:
    receiving plant influent wastewater and return activated sludge in a first tank operating under anoxic conditions;
    mixing the plant influent wastewater with the return activated sludge to form a mixed liquor, wherein the mixed liquor comprises bacterial populations that are capable of fermenting dissolved organic matter and particulate organic matter;
    fermenting the dissolved organic matter and the particulate organic matter, by the bacterial populations, to provide a carbon source in the first tank thus eliminating a need for an addition of an external carbon source;
    transferring the mixed liquor to a second tank operating under microaerophilic conditions to allow for further fermentation of the dissolved organic matter and the particulate organic matter providing an additional carbon source to promote development of the bacterial populations used for simultaneous phosphorus release and phosphorus uptake in the second tank;

transferring the mixed liquor to a third tank that separates treated effluent from activated sludge containing the bacterial populations for fermenting the dissolved organic matter and the particulate organic matter; and recycling a portion of the activated sludge containing the bacterial populations to the first tank as the return activated sludge.

10. The process of claim 9, wherein the bacterial populations comprise both heterotrophic and autotrophic bacteria that reside in the activated sludge.

11. The process of claim 9, wherein phosphorus release occurs in the first tank under anoxic conditions.

12. The process of claim 9, wherein nitrification, denitrification, phosphorus release, and phosphorus uptake occur simultaneously in the second tank under aerated conditions.

13. The process of claim 9, wherein a concentration of dissolved oxygen in the second tank is less than 1.0 mg/l of fluid.

14. A method for treating wastewater to simultaneously remove organic matter, nitrogen, and phosphorus, the process comprising:

contacting plant influent wastewater with return activated sludge in an anoxic tank to form a mixed liquor;

flowing the mixed liquor to an aerated tank operating under microaerophilic conditions to allow for fermentation of particulate organic matter and dissolved organic matter, wherein the microaerophilic conditions in the aerated tank further allow for simultaneous nitrification, denitrification, phosphorous release, and phosphorus uptake in the aerated tank;

flowing the mixed liquor to a membrane tank to separate plant effluent wastewater from activated sludge;

recycling a portion of the activated sludge to the anoxic tank as the return activated sludge; and transferring the plant effluent wastewater for further processing.

15. The method of claim 14, wherein the plant influent wastewater and the return activated sludge are mixed by a mixer in the anoxic tank.

16. The method of claim 14, wherein phosphorus release occurs in the anoxic tank.

17. The method of claim 14, wherein a concentration of dissolved oxygen in the aerated tank is less than 1.0 mg/l.

* * * * *